US012703634B2

(12) United States Patent
Mahfouz et al.

(10) Patent No.: US 12,703,634 B2
(45) Date of Patent: Aug. 11, 2026

(54) LASER-ASSISTED SYNTHESIS OF GRAPHENE FROM PITCH

(71) Applicant: SAUDI ARABIAN OIL COMPANY, Dhahran (SA)

(72) Inventors: Remi Mahfouz, Dhahran (SA); Konstantin Novoselov, Singapore (SG); Abdullah Alshahrani, Dammam (SA); Nada Qari, Dammam (SA); Noor Alsakhin, Al Qatif (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/780,594

(22) Filed: Jul. 23, 2024

(65) Prior Publication Data

US 2026/0028230 A1 Jan. 29, 2026

(51) Int. Cl.
*C01B 32/184* (2017.01)
*B05D 1/00* (2006.01)
(Continued)

(52) U.S. Cl.
CPC ............ *C01B 32/184* (2017.08); *B05D 1/005* (2013.01); *B05D 3/0493* (2013.01); *B05D 3/06* (2013.01); *C01P 2002/82* (2013.01)

(58) Field of Classification Search
CPC .......... C01B 32/184; B05D 1/005; B05D 3/06
(Continued)

(56) References Cited

U.S. PATENT DOCUMENTS

2014/0162464 A1* 6/2014 Dimitrakopoulos .... H01L 21/02 438/761
2015/0270406 A1* 9/2015 Sun ......................... H10P 34/42 257/29
(Continued)

FOREIGN PATENT DOCUMENTS

CN 114671428 A 6/2022
CN 110167877 B 2/2024
(Continued)

OTHER PUBLICATIONS

Zang et al., "Laser-engineered heavy hydrocarbons: Old materials with new opportunities," Sci. Adv. 2020; 6 : eaaz5231 (Apr. 24, 2020). (Year: 2020).*

(Continued)

*Primary Examiner* — William P Fletcher, III
(74) *Attorney, Agent, or Firm* — Osha Bergman Watanabe & Burton LLP

(57) ABSTRACT

A method for synthesizing graphene includes depositing pitch on a substrate to provide a pitch sample, and pyrolyzing at least a portion of the pitch sample with a laser, thereby forming graphene. A method for upgrading pitch includes providing a pitch sample under vacuum, and irradiating the pitch with a laser to form an upgraded pitch product. A system for synthesizing graphene includes a pitch deposition system configured to deposit pitch on a substrate to form a deposited pitch sample, and a laser irradiation system. The laser irradiation system includes a laser comprising an outlet for a beam of light, and a substrate holding area in line with the outlet of the laser. The laser irradiation system is capable of transforming at least a portion of the deposited pitch sample to form graphene.

6 Claims, 5 Drawing Sheets

(51) Int. Cl.
*B05D 3/04* (2006.01)
*B05D 3/06* (2006.01)

(58) Field of Classification Search
USPC .............. 427/228, 414–445 B, 554; 977/734
See application file for complete search history.

(56) References Cited

U.S. PATENT DOCUMENTS

2019/0330064 A1* 10/2019 Tour ........................ H01G 11/36
2022/0267153 A1* 8/2022 Tour ....................... H01M 4/583
2023/0357016 A1* 11/2023 Liu ........................ C01B 32/196
2024/0417263 A1* 12/2024 Watkins ................ C01B 32/184

FOREIGN PATENT DOCUMENTS

KR 20210107945 A * 9/2021 ........... C01B 32/184
WO 2023132979 A2 7/2023

OTHER PUBLICATIONS

Sanford et al., "Flash Graphene Morphologies," ACS Nano 2020, 14, 1391-13699. (Year: 2020).*
Zang et al., "Upgrading carbonaceous materials: Coal, tar, pitch, and beyond," Matter 5, 430-477, Feb. 2, 2022. (Year: 2021).*
Pyrolysis, Hawley's Condensed Chemical Dictionary, https://access.infobase.com/article/1013277-pyrolysis (last visited Nov. 6, 2025). (Year: 2025).*
Q. Abbas, et al., "Graphene Synthesis Techniques and Evironmental Applications," Materials, 2022 (49 pages).
R. Das, et al., "Fabrication and Properties of Spin-Coated Polymer Films," Nano-size Polymers, Chapter 10, 2016 (24 pages).
J. Jiang, et al., "Graphene synthesis by laser-assisted chemical vapor deposition on Ni plate and the effect of process parameters on unifrom graphene growth," Thin Solid Films 556, 2014 (5 pages).
R. Kumar, et al., "Laser-assisted synthesis, reduction and micro-patterning of graphene: Recent progress and applications," Coordination of Chemistry Reviews, 2017 (86 pages).
X.J. Lee, et al., "Review on graphene and its derivatives: Synthesis methods and potential industrial implementation," Journal of the Taiwan Institute of Chemical Engineers, 2018 (18 pages).
J.Y. Lim, et al., "Recent trends in the synthesis of graphene and graphene oxide based nanomaterials for removal of heavy- A review," Journal of Industrial and Engineering Chemistry, 2018 (79 pages).
J. Lin, et al., "Laser-induced porous graphene films from commercial polymers," Nature Communications, 2014 (8 pages).
N. Kumar, et al., "Top-down synthesis of graphene: A comprehensive review," FlatChem, 2021 (40 pages).
J.B. Park, et al., "Fast growth of graphene patterns by laser direct writing," Applied Physics Letters 98, 2011 (3 pages).
Z. Peng, et al., "Flexible and Stackable Laser Induced Graphene Supercapacitors," ACS Applied Material Interfaces, 2015 (22 pages).
R. Singh, et al., "Graphene: Potential material for nanoelectronics applications," Indian Journal of Pure & Applied Physics, 2015 (13 pages).
V. Strong, "Patterning and Electronic Tuning of Laser Scribed Graphene for Flexible All-Carbon Devices," American Chemical Society, 2012 (9 pages).
Y. Tao, et al., "Localized insulator-conductor transformation of graphene oxide thin films via focused laser beam irradiation," Applied Physics A, Materials Science & Processing, 2012 (9 pages).
D. Wei, et al., "Laser direct growth of graphene on silicon substrate," Applied Physics Letters 100, 2012 (3 pages).
Y. Zhou, et al., "Microstructuring of Graphene Oxide Nanosheets Using Direct Laser Writing," Advanced Materials, 2010 (5 pages).
International Search Report and Written Opinion issued in Application No. PCT/US2025/038491, mailed on Nov. 14, 2025 (13 pages).

* cited by examiner

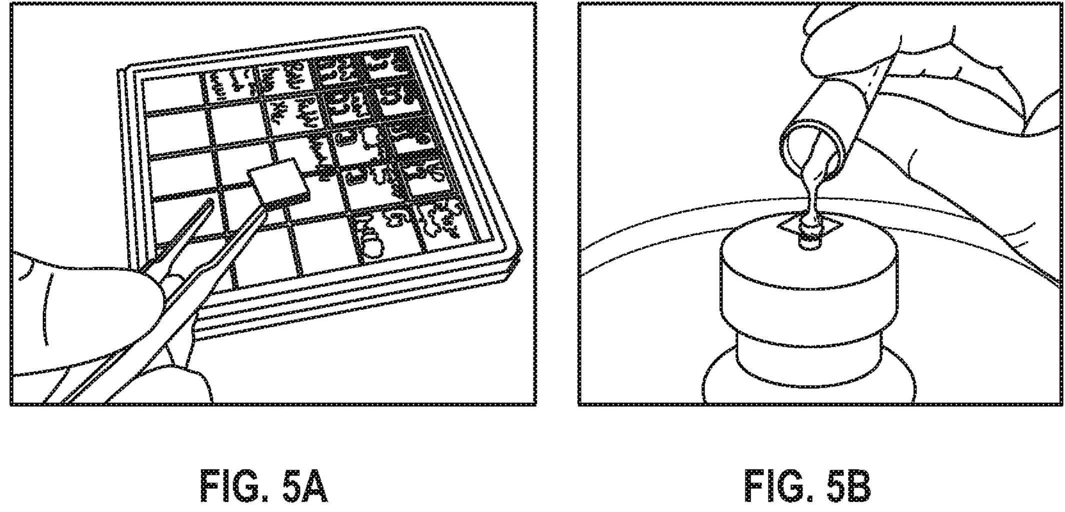
FIG. 5A
FIG. 5B
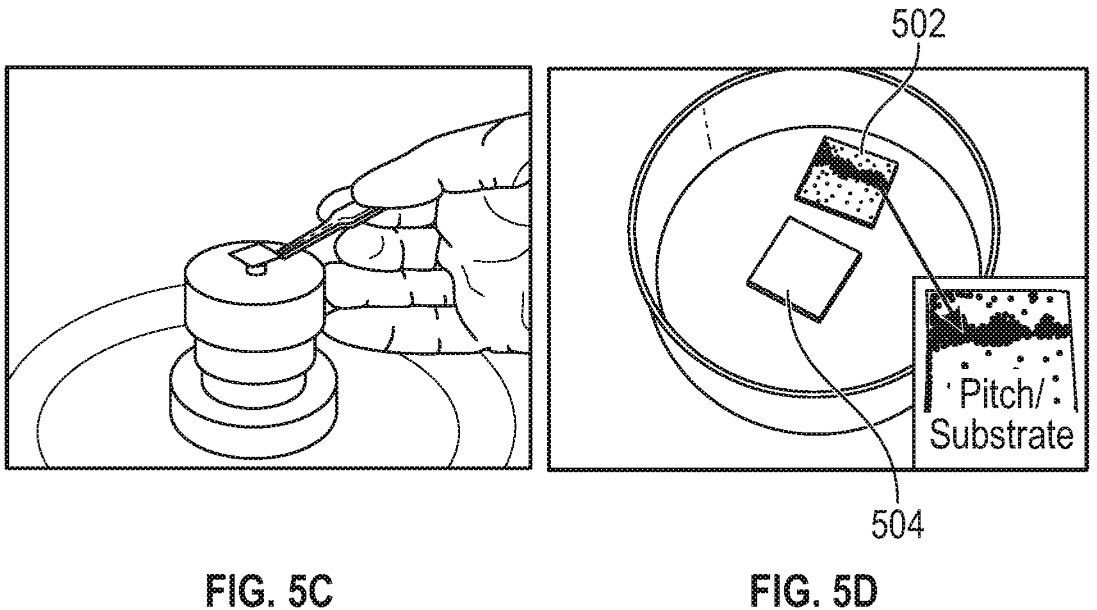
FIG. 5C
FIG. 5D

LASER-ASSISTED SYNTHESIS OF GRAPHENE FROM PITCH

BACKGROUND

Currently there are two major methods for mass production of graphene: (i) the bottom-up method of Chemical Vapor Deposition (CVD) using hydrocarbon precursors; and (ii) the top-down method of electro-chemical (or mechanical) exfoliation of graphite precursor. The two methods have different principles and produce a different number of graphene layers with unique qualities. For example, the CVD method produces strictly monolayer graphene, which can be altered to produce bilayer or a few layers having a large surface area. On the other hand, the electrochemical or mechanical exfoliation method typically results in a graphene suspension that can include various liquids or a powder of graphene flakes that can be functionalized. Each graphene flake can range from a few nanometers to several microns in size. Thus, the type of method used to synthesize graphene will determine the number of layers and interlayer spacing, which can have a significant effect on the physical and/or chemical properties of graphene, and hence, its applications.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for synthesizing graphene. The method includes depositing pitch on a substrate to provide a pitch sample, and pyrolyzing at least a portion of the pitch sample with a laser, thereby forming graphene.

In another aspect, embodiments disclosed herein relate to a method for upgrading pitch. The method includes providing a pitch sample under vacuum and irradiating the pitch with a laser to form an upgraded pitch product.

In another aspect, embodiments disclosed herein relate to a system for synthesizing graphene. The system includes a pitch deposition system configured to deposit pitch on a substrate to form a deposited pitch sample, and a laser irradiation system. The laser irradiation system includes a laser comprising an outlet for a beam of light, and a substrate holding area in line with the outlet of the laser. The laser irradiation system is capable of transforming at least a portion of the deposited pitch sample to form graphene.

Other aspects and advantages of the claimed subject matter will be apparent from the following description and the appended claims.

BRIEF DESCRIPTION OF DRAWINGS

FIGS. 5A through 5D show photographic representations of a process for depositing a pitch sample on a substrate.

DETAILED DESCRIPTION

Figure 1:
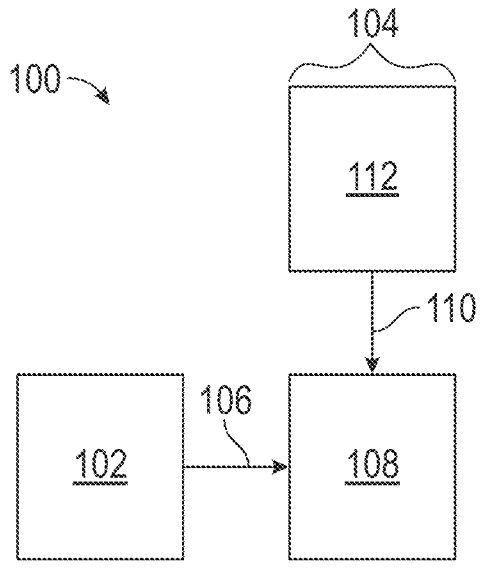
FIG. 1 shows a simplified diagram of a system for synthesizing graphene in accordance with one or more embodiments.

Throughout the application, ordinal numbers (for example, first, second, third) may be used as an adjective for an element (that is, any noun in the application). The use of ordinal numbers does not imply or create a particular ordering of the elements or limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "a horizontal beam" includes reference to one or more of such beams.

Terms such as "approximately" or "substantially" mean that the recited characteristic, parameter, or value need not be achieved exactly, but that deviations or variations, including, for example, tolerances, measurement error, measurement accuracy limitations, and other factors known to those of skill in the art, may occur in amounts that do not preclude the effect the characteristic was intended to provide.

It is to be understood that one or more of the steps shown in the block flow diagrams may be omitted, repeated, or performed in a different order than shown. Accordingly, the scope disclosed should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

Graphene is generally prepared through either CVD or electrochemical methods. Although both methods are considered scalable routes for graphene production, the final quality of the produced graphene cannot be easily compared due to the diverse processing parameters. Generally, graphene prepared via CVD has a relatively higher quality and cost than electro-chemical (or mechanical) exfoliation. For example, CVD growth graphene is primarily used in the electronics industry for sensor or transistor applications, in optoelectronics, as transparent contacts (e.g., in touch panels), in transparent heating elements, as ionic and proton membranes, among other electronic applications. Flake graphene, obtained via electrochemical or mechanical exfoliation, is typically used for energy applications (batteries, supercapacitors), composites, coating, among other applications.

Embodiments disclosed herein relate to the synthesis of graphene via laser assisted upgrading of pitch. One or more embodiments of the present disclosure relate to a system for synthesizing graphene, a method for synthesizing pitch, and a method for upgrading pitch. Embodiments of the present disclosure may have several advantages over the CVD and exfoliation methods as the systems and methods herein can be achieved at relatively low temperatures, with shorter reaction times, and have less of an impact on the environment when compared to CVD and exfoliation methods.

Additionally, the systems and methods herein allow for the production of graphene in a highly reproduceable and scalable manner with controlled parameters, thereby allowing the direct growth of graphene over any desired surface. Graphene synthesized with systems and methods herein can be used in applications that require the in-situ growth of graphene at low temperature, such as flexible electrodes, field effect-transistors, and sensors.

System for Synthesizing Graphene

In one aspect, embodiments disclosed herein relate to a system for synthesizing graphene, graphene species, or any combination thereof. As used herein, the term "graphene species" refers to amorphous graphene, 3-dimensional (3D) graphene, graphene nanoflakes, or any combination thereof. In some embodiments, the system is capable of producing high quality graphene, such as 1 to 10 layers of graphene, depending upon the quality of the pitch sample prepared prior to laser irradiation. The system may include a pitch deposition system, a laser irradiation system, or both. The pitch deposition system may be configured to manually deposit petroleum pitch onto a substrate, deposit petroleum pitch on a substrate in an automated fashion, or any combination thereof. The laser irradiation system may include a laser, a substrate holding area, a vacuum system, or any combination thereof. FIG. 1 shows a system 100 for synthesizing graphene in accordance with one or more embodiments. System 100 includes a pitch deposition system 102 and a laser irradiation system 104.

A pitch deposition system 102 may include a pitch source, a substrate, a casting system, a coating system, or any combination thereof. Pitch deposition system 102 may be in fluid communication with a pitch source (not shown). The pitch source may be a storage tank or container configured to store pitch. As used throughout this disclosure, the term "pitch" is a viscoelastic polymeric material that includes aromatic hydrocarbons. Pitch is generally considered a low value material that is obtained from petroleum, coal tar, petrochemical refining plants, or derived from plant materials. For example, pitch may include a plant derived resin (e.g., rosin). Pitch can be produced via the distillation of carbon-based materials, such as plants, crude oil, and coal. Pitch often requires high energy and multi-step processes for transformation into valuable carbon-based materials.

In one or more embodiments, pitch includes bitumen, asphalt, a heavy fraction obtained from a crude oil upgrading process, or any combination thereof. Pitch according to one or more embodiments may include pyrolyzed fuel oil, slurry oil, vacuum residue oil, light vacuum gas oil, heavy vacuum gas oil, cuts obtained at 350° C. or above by vacuum distillation, atmospheric distillation, or both, or any combination thereof. In one or more particular embodiments, pitch includes an atmospheric distillate cut at 540° C. of a heavy crude (i.e., a "heavy cut" or a "heavy fraction"). The heavy fraction can contain asphaltenes when it is derived from carbonaceous sources such as petroleum, coal or oil shale. Asphaltogenic compounds are present in petroleum in insignificant quantities. There is a close relationship between asphaltenes, resins and high molecular weight polycyclic hydrocarbons. Asphaltenes are hypothesized to be formed by the oxidation of natural resins. The hydrogenation of asphaltic compounds containing neutral resins and asphaltene produces heavy hydrocarbon oils, i.e., neutral resins and asphaltenes are hydrogenated into polycyclic aromatic or hydroaromatic hydrocarbons. They differ from polycyclic aromatic hydrocarbons by the presence of oxygen and sulfur in varied amounts.

Pitch deposition system 102 may be configured to deposit pitch on a substrate. The substrate may have a flat surface and an elongated portion extending from the flat surface (explained in greater detail below with reference to FIG. 2). The flat surface may include metals, metal alloys, metal oxides, composites such as polymeric composites, non-metallic substrates, or any combinations thereof. The flat surface may include one or more materials selected from the group consisting of silicon, nickel, copper, and combinations thereof.

Pitch deposition system 102 may include one or more units configured to cast or coat pitch onto the substrate to form a pitch sample. For example, pitch deposition system 102 may include one a casting system, a coating system or both. The casting system, the coating system, or both may include one or more units configured to drop cast, doctor blade, brush coat, print, or spin coat pitch onto the flat surface of the substrate. The casting system, the coating system, or both may include one or more units to increase the homogeneity of the pitch after initial deposition, level the thickness of the deposited pitch, or combinations thereof. In one or more particular embodiments, pitch deposition system 102 includes a spin coating apparatus. In some embodiments, pitch deposition system 102 may be configured to allow for the manual deposition of pitch onto a substrate from a pitch source. In such embodiments, the pitch deposition system 102 may be configured to perform a treatment to level the deposited pitch to uniformly distribute pitch on the substrate.

In some embodiments, pitch deposition system 102 may be configured to produce a uniform pitch sample. The term "uniform pitch sample" refers to a sample having a cast or coating thickness that is substantially the same throughout the cast or coating. In some embodiments, the thickness of the pitch cast or coating at any one location may have a thickness difference within 2 nanometers (nm) to 5 microns (μm) of the overall average thickness of the pitch. In one or more embodiment, any one location of the pitch may have a thickness difference within an overall average thickness of the pitch in a range having a lower limit of any one of 2 nm, 3 nm, 5 nm, 10 nm, 25 nm, 50 nm, 100 nm, 500 nm, 1 mm (millimeter), 2.5 mm, 5 mm, 10 mm, 50 mm, 100 mm, 500 mm, and 1 μm and an upper limit of any one of 10 nm, 50 nm, 100 nm, 500 nm, 1 mm, 2.5 mm, 5 mm, 10 mm, 50 mm, 100 mm, 500 mm, 1 μm, 2.5 μm, and 5 μm, where any lower limit can be paired with any mathematically compatible upper limit.

In one or more embodiments, pitch deposition system 102 is separate from a laser irradiation system 104 such that a pitch sample produced by the pitch deposition system 102 is transferred to laser irradiation system 104. For example, a pitch sample may be transferred (represented by arrow 106) to a substrate holding area 108 of the laser irradiation system 104 from a pitch deposition system 102. In some embodiments, pitch deposition system 102 is capable of automatically transferring a deposited pitch sample (e.g., a pitch coated substrate) from pitch deposition system 102 to substrate holding area 108. In such embodiments, pitch deposition system 102 may include one or more sample transport units in communication with substrate holding area 108. In some embodiments, the pitch sample generated from pitch deposition system 102 is manually placed in substrate holding area 108. System 100 may include one or more units configured to analyze the thickness of a pitch deposit on the substrate. The one or more units may include a coating thickness gauge, an ellipsometer, among other units configured to measure a coating thickness.

Substrate holding area 108 includes a substrate holding area configured to hold the elongated portion of the pitch sample during laser treatment. As mentioned above, the elongated portion of the pitch sample may be a portion of the pitch sample that does not include a deposited pitch. When located in the substrate holding area 108, the pitch coated flat portion of the substrate may be in line (represented by arrow 110) with an outlet of a laser 112 of laser irradiation system 104.

In some embodiments, one or more components of system 100 is configured to operate under air free conditions. For example, one or more components of system 100 may be in fluid connection with a vacuum system, an inert gas system, or both. The vacuum system, inert gas system, or both may be in fluid communication with substrate holding area 108, laser 112, pitch deposition system 102, or any combination thereof. The vacuum system may be configured to remove one or more atmospheric gases from the pitch sample in substrate holding area 108, one or more atmospheric gases from a light path emitted from laser 112, or any combination thereof. The inert gas system may be configured to introduce one or more inert gases to the pitch sample in substrate holding area 108, to a light path of laser 112, to laser 112, or any combination thereof. In one or more embodiments, the substrate holding area 108 is in fluid communication with a vacuum system such that the laser irradiation system 104 is capable of transforming the deposited pitch sample under vacuum. The one or more inert gases may be selected from the group consisting of nitrogen, argon, helium, and mixtures thereof.

In one or more embodiments, laser 112 is an excimer laser, a YAG laser, or any combination thereof. Laser 112 may be configured to emit laser light in the wavelength range of about 120 nm (nanometers) to about 1100 nm. Laser 112 may be configured to emit laser light in the ultraviolet wavelength range having a lower limit of any one of 120 nm, 122 nm, 124 nm, 126 nm, 135 nm, 140 nm, 145 nm, 146 nm, 150 nm, 155 nm, 157 nm, 160 nm, 175 nm, 190 nm, 193 nm, 200 nm, 210 nm, 220 nm, 222 nm, 230 nm, 235 nm, 240 nm, 245 nm, 248 nm, 250 nm, 270 nm, 275 nm, 280 nm, 282 nm, 290 nm, 300 nm, 305 nm, 307 nm, 308 nm 310 nm, 325 nm, 350 nm, 400 nm, 450 nm, 500 nm, 550 nm, 600 nm, 700 nm, 800 nm, 900 nm, and 1000 nm and an upper limit of any one of 308 nm, 310 nm, 315 nm, 320 nm, 325 nm, 330 nm, 335 nm, 340 nm, 345 nm, 350 nm, 351 nm, 360 nm, 400 nm, 500 nm, 600 nm, 700 nm, 800 nm, 900 nm, 1000 nm, and 1100 nm, where any lower limit can be paired with any mathematically compatible upper limit. In one or more embodiments, the laser of the laser irradiation system is capable of transforming at least a portion of the deposited pitch sample to form graphene. In one or more embodiments, laser 112 is configured to emit laser light at about 308 nm, at about 351 nm, at about 532 nm, or about 1064 nm. In some embodiments, laser 112 is an excimer laser.

The laser 112 may have a pulse energy in a range from 0.1 to 2 Joules. The laser may have a pulse energy in a range having a lower limit of any one of 100 milliJoules (mJ), 110 mJ, 150 mJ, 175 mJ, 200 mJ, 220 mJ, 240 mJ, 250 mJ, 260 mJ, 270 mJ, 280 mJ, 290 mJ, and 299 mJ and an upper limit of any one of 300 mJ, 305 mJ, 310 mJ, 320 mJ, 350 mJ, 500 mJ, 1 J, 1.25 J, 1.5 J, and 2 J, where any lower limit can be paired with any mathematically compatible upper limit.

Figure 2A:
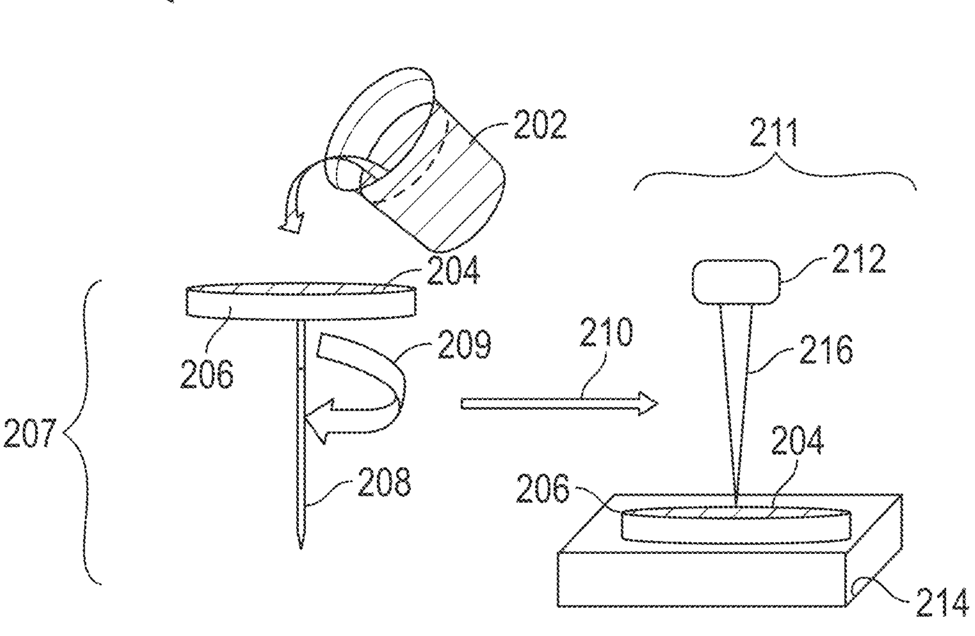
FIG. 2A shows an example of system for synthesizing graphene in accordance with one or more embodiments.

FIG. 2A shows an example system 200 for synthesizing graphene in accordance with one or more embodiments. In system 200, a pitch source 202 includes a container of pitch that is used to deposit pitch 204 onto a flat portion 206 of substrate 207. The substrate 207 may have different configurations depending upon the coating technique. However, with reference to FIG. 2A, the substrate 207 is for a spin coating technique as explained as follows. Substrate 207 includes an elongated portion 208 extending from flat portion 206 such that a substrate having a deposited pitch may be held stationary by elongated portion 208. In FIG. 2A, arrow 209 represents a treatment (e.g., spin coating via a spin coating apparatus) to level deposited pitch 204 on the flat portion 206 of substrate 207. The deposited pitch sample may be transferred (indicated by arrow 210) to laser irradiation system 211. Laser irradiation system includes laser 212 and a substrate holding area 214. Substrate holding area 214 includes a substrate holding area configured to hold the elongated portion 208 of substrate 207 such that substrate 207 is held stationary in line with outlet of laser 212. Laser 212 is configured to emit laser light in the ultraviolet range and in a laser light path in line with a deposited pitch sample 204 to upgrade pitch to a product 218 such as graphene.

Figure 2B:
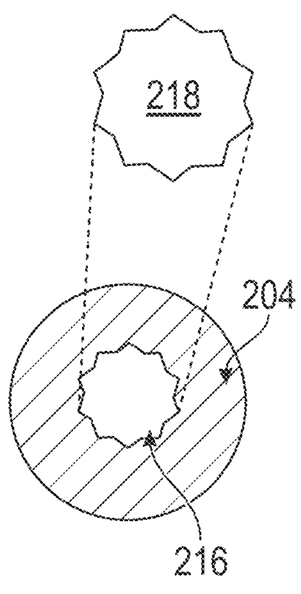
FIG. 2B shows an example of an irradiated pitch sample in accordance with one or more embodiments.

FIG. 2B shows a top view example of deposited pitch sample 204 after laser irradiation treatment of area 216. Area 216 is an area in line with the laser light path of laser 212 such that area 216 is contacted with light energy from laser 212. In some embodiments, irradiated area 216 may be a pyrolyzed carbonaceous material. In particular embodiments, the pyrolyzed carbonaceous material includes a polyaromatic carbon material. For example, in one or more embodiments, the irradiated area 216 may include graphene. Graphene produced by a system of one or more embodiments may be particularly useful for one or more energy applications, electronic applications, or combinations thereof due to a high surface area and pore volume allow for a large relative amount of surface functionality per mass of carbon.

Figure 3:
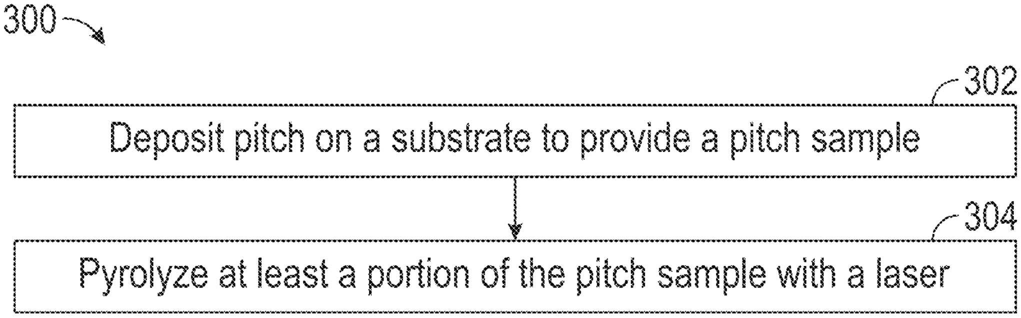
FIG. 3 is a block flow diagram of a method for synthesizing graphene in accordance with one or more embodiments.

As used herein "graphene" refers to a two-dimensional material including bonded carbon atoms and a plurality of aromatic rings. Graphene has high surface area and pore volume, and in particular, a higher surface area and pore volume than a pyrolyzed carbon. As mentioned previously, the system of one or more embodiments may be capable of producing graphene film, graphene particles such as graphene flakes, or any combination thereof. Graphene flakes of one or more embodiments may range in size (i.e., diameter) from 2 nm to 5 μm. In one or more embodiment, graphene flakes have a diameter in a range having a lower limit of any one of 2 nm, 3 nm, 5 nm, 10 nm, 25 nm, 50 nm, 100 nm, 500 nm, 1 mm (millimeter), 2.5 mm, 5 mm, 10 mm, 50 mm, 100 mm, 500 mm, and 1 μm and an upper limit of any one of 10 nm, 50 nm, 100 nm, 500 nm, 1 mm, 2.5 mm, 5 mm, 10 mm, 50 mm, 100 mm, 500 mm, 1 μm, 2.5 μm, and 5 μm, where any lower limit can be paired with any mathematically compatible upper limit Method for Synthesizing Graphene In another aspect, one or more embodiments herein relate to a method for synthesizing graphene. The method of one or more embodiments may include use of a system as described previously (e.g., system 100 of FIG. 1). FIG. 3 shows a block flow diagram of a non-limiting method 300 in accordance with one or more embodiments. As shown in FIG. 3, method 300 may include depositing pitch on a substrate to provide a pitch sample in block 302. In some embodiments, method 300 includes obtaining pitch from a petroleum or petrochemical process prior to depositing pitch on the substrate. For example, the pitch may be obtained from a hydrotreating process such that impurities including, but not limited to, sulfur is nearly negligible. In such embodiments, the graphene obtained from the hydrotreated pitch includes a negligible amount of impurities. In some embodiments, pitch includes heteroatoms that could interfere with the formation of graphene, graphene species, or combinations thereof. In such embodiments, the pitch may be treated, such as with annealing at elevated temperatures in a range from about 1000° C. to about 2000° C. under vacuum and inert gas. For example, pitch may be annealed once it has been deposited onto the substrate. In some embodiments, the application of the graphene, graphene species, or combinations thereof produced determines if a pre-treatment of the pitch is required.

Depositing pitch on the substrate as shown in block 302 includes introducing pitch to a flat surface of the substrate. Pitch may be introduced via a casting or coating method, including, but not limited to, drop casting, spinning, among other methods. Pitch may be uniformly deposited on the substrate. In some embodiments, the pitch disposed on the flat surface of the substrate is further treated to level the thickness of the pitch and to produce a uniformly coated pitch sample. The treatment to level the thickness of the pitch on the substrate may be spin-coating. In some embodiments, the thickness of the coated layer of pitch is controlled. Controlling the thickness of the pitch may include diluting the pitch in a dilution solvent to produce a thinner film. Controlling the thickness of the pitch may include concentrating the pitch in a solvent to produce a thicker film. The "solvent" or "dilution solvent" may be any solvent capable of solubilizing or suspending the pitch. In some embodiments, one or more parameters of the pitch deposition system may be controlled to produce a uniform pitch. For example, the rotations per minute of a spin-coating apparatus may be adjusted to produce a uniform pitch sample.

In some embodiments, the thickness of the pitch deposited on the flat surface of the substrate is measured and characterized using an ellipsometer. The ellipsometer measurement may be carried out before and after irradiation such that one or more parameters of the pitch deposition system, laser irradiation system, or both can be adjusted to produce a graphene and/or a graphene species.

The pitch sample may be introduced to a laser irradiation system. The laser irradiation system may be as described in FIG. 1. The pitch sample may be introduced and held stationary in a substrate holding area of the laser irradiation system. The coated pitch of the pitch sample introduced and held stationary in the substrate holding area may be in line with an outlet of a laser. The outlet of the laser may direct laser light toward the coated pitch. In one or more embodiments, the method includes removing one or more atmospheric gases from the pitch sample with a vacuum. In some embodiments, the method includes introducing an inert gas to the pitch sample, a laser of the laser irradiation system, or both.

Method 300 includes pyrolyzing at least a portion of the pitch sample with a laser in block 304, thereby forming graphene. In some embodiments, the total area of the deposited pitch sample is irradiated by the laser to form graphene. In some embodiments, pyrolyzing the at least the portion of the pitch sample is performed under vacuum. At least a portion of the pitch sample may be pyrolyzed by irradiating the pitch sample with a laser, such as an excimer laser.

In some embodiments, at least a portion of the pitch sample is irradiated with laser light for a period of time in a range from 30 seconds(s) to 15 minutes (min). The at least a portion of the pitch sample may be irradiated for a period of time in a range having a lower limit of any one of 30 s, 45 s, 1 min, 2 min, 5 min, 8 min, and 9 min and an upper limit of any one of 1.5 min, 3 min, 5 min, 7.5 min, 10 min, 11 min, 12.5 min, and 15 min, where any lower limit can be paired with any mathematically compatible upper limit. At least a portion of the pitch sample is irradiated with laser light having a pulse frequency in a range of 40 to 60 Hz (Hertz). At least a portion of the pitch sample is irradiated with laser light have a pulse frequency having a lower limit of any one of 40, 41, 42, 43, 44, 45, 46, 47, 48, 49, and 50 Hz, and an upper limit of any one of 50, 51, 52, 53, 54, 55, 56, 57, 58, 59, and 60 Hz, where any lower limit can be paired with any mathematically compatible upper limit.

In some embodiments, the method includes analyzing the irradiated portion of the pitch sample. Analysis of the irradiated portion may include using spectroscopic systems and methods to monitor and/or confirm the production of graphene. For example, the method may include analyzing an irradiated portion of pitch and a non-irradiated portion with Raman spectroscopy to determine growth of bands at 1361 $cm^{-1}$ and 1584 $cm^{-1}$ (i.e., D and G bands characteristic of graphene production). In some embodiments, analyzing an irradiated portion of pitch includes performing X-ray Diffraction (XRD), Transmission Electron Microscopy (TEM), or both on the irradiated pitch sample. The method of one or more embodiments may include analyzing a deposited pitch sample prior to irradiation with one or more selected from Raman Spectroscopy, XRD, and TEM. Graphene, graphene species, or combinations thereof produced in accordance with one or more embodiments may be removed from the substrate by chemical methods, mechanical methods, or any combination thereof.

In some embodiments, one or more parameters of the laser irradiation system are adjusted based on analysis performed on the irradiated pitch sample, the deposited pitch sample prior to irradiation, or both. The one or more parameters of the laser irradiation system that may be adjusted include, but are not limited to, laser emission wavelength, irradiation time, laser energy, laser spot, pulse duration such as nanosecond, picosecond, or femtosecond exposure, or any combination thereof to optimize the production of graphene, graphene species, or combinations thereof.

One or more embodiments of the present disclosure may include using multiple laser set-ups (e.g., multiple laser systems) and multiple deposited pitch samples to produce large-scale (e.g., bulk) quantities of graphene, graphene species, or combinations thereof.

Method for Upgrading Pitch

Figure 4:
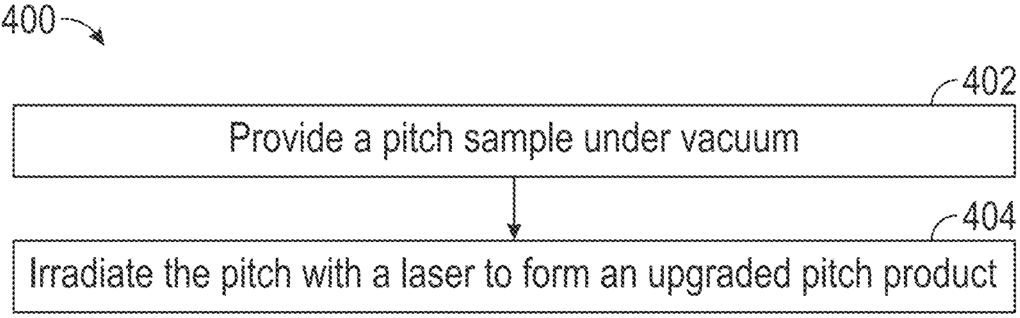
FIG. 4 is a block flow diagram of a method for upgrading pitch in accordance with one or more embodiments.

In another aspect, embodiments here relate to a method for upgrading pitch. The term "upgrading" used in this disclosure refers to a process of transforming pitch from a material that traditionally requires several energetically and materially intensive processes to a material that is relatively more easily processed. In particular, a method for upgrading pitch may include one or more steps of a method for synthesizing graphene (e.g., method 300 as shown in FIG. 3). An example of a method 400 for upgrading pitch may be as shown in FIG. 4. Method 400 may include providing a pitch sample in block 402. The pitch sample may be provided by depositing pitch on a substrate to form the pitch sample (e.g., as described in block 302 of method 300). Method 400 may include irradiating the pitch with a laser to form an upgraded pitch product in block 404. The upgraded pitch product may include graphene, graphene species such as graphene nanoflakes, amorphous graphene, or any combination thereof.

EXAMPLE

Petroleum pitch was obtained as an atmospheric distillate cut at 540° C. of heavy crude fraction from Saudi Aramco, a low value precursor generally obtained from several refining and petrochemical processes within Aramco. The pitch (5-10 milliliters (mL)) was deposited on a substrate by spin coating (at 1500 rotations per minute) as shown in FIGS. 5A to 5D. 5A shows a substrate before introduction of pitch. FIG. 5B shows the introduction of pitch to a substrate in a spin coating apparatus. FIG. 5C shows a pitch sample after spin coating. FIG. 5D shows a pitch sample 502 as compared to an uncoated substrate 504.

Figure 6A:
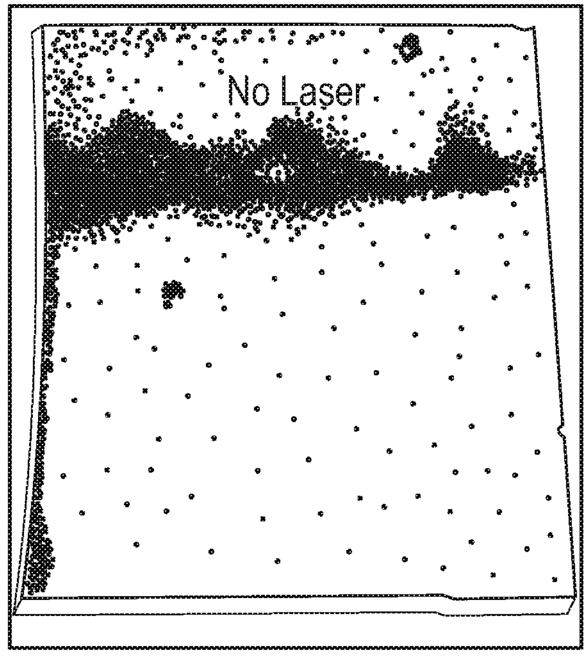
FIG. 6A shows a pitch sample before laser irradiation.
Figure 6B:
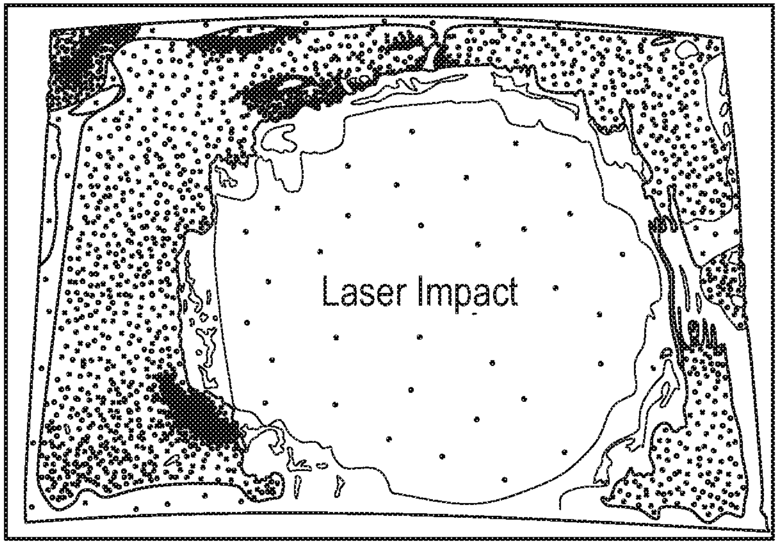
FIG. 6B shows a pitch sample after laser irradiation.

After spin-coating, the pitch sample was subjected to vacuum conditions (i.e., a vacuum pressure of $4.5\times10^{-5}$ mbar) to avoid the oxidation of the pitch under the laser irradiation. A 308 nm excimer laser was used to irradiate the surface of the pitch sample with a 50 Hz frequency with an energy of 300 mJ. The pitch sample was irradiated for 1 minute and the irradiation area was analyzed with Raman spectroscopy. The pitch sample was then subjected to an additional 10 min of laser irradiation with an energy of 300 mJ. FIG. 6A shows a pitch sample without irradiation. FIG. 6B shows a pitch sample after irradiation with a zone of laser impact.

Figures 7A, 7B:
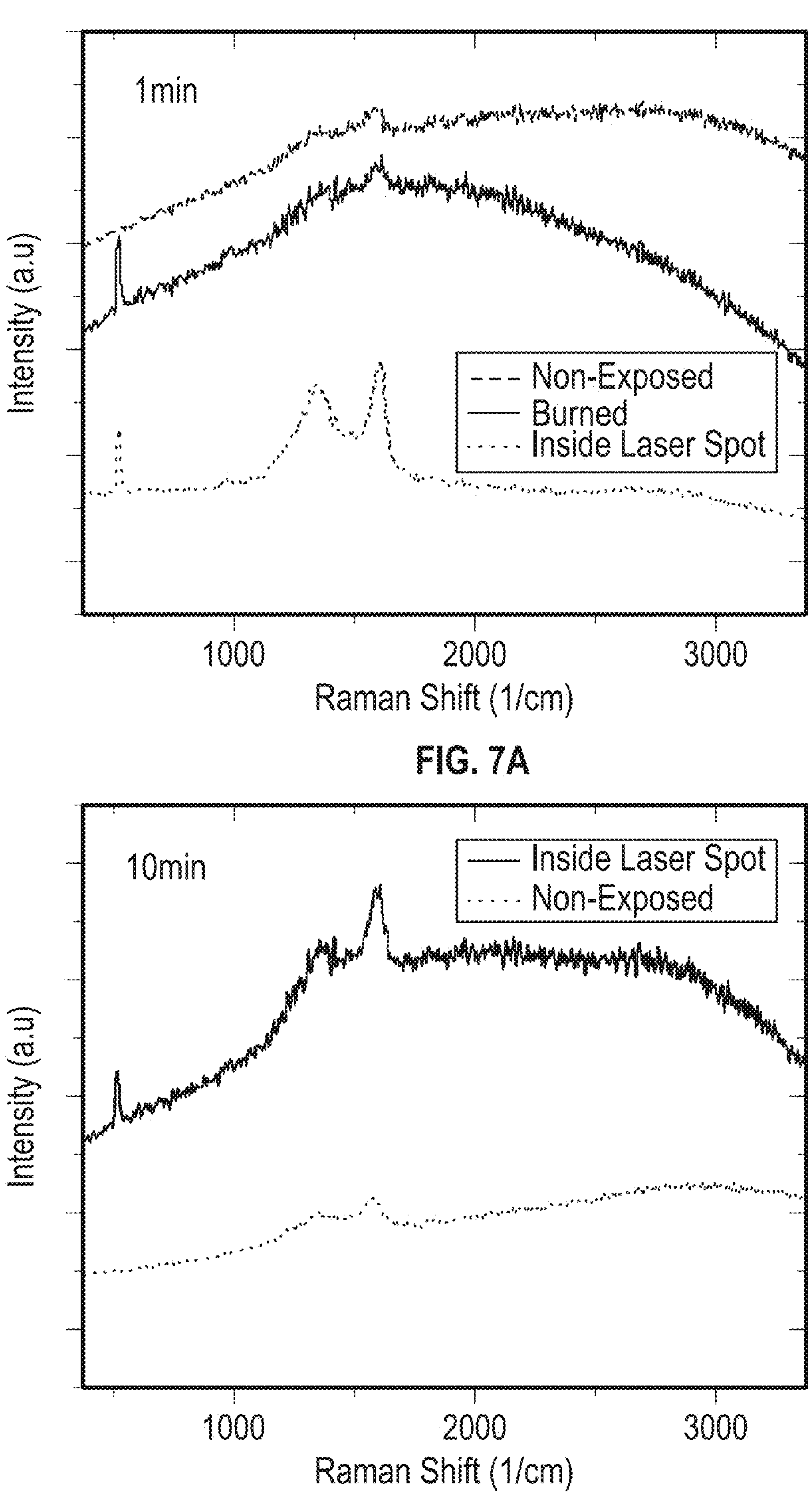
FIG. 7A is a graph showing Raman spectra of a pitch sample before laser irradiation, a burned portion of a pitch sample, and inside the laser irradiated spot of a pitch sample irradiated for 1 minute.
FIG. 7B is a graph showing Raman spectra of a pitch sample before laser irradiation, a burned portion of a pitch sample, and inside the laser irradiated spot of a pitch sample irradiated for 10 minutes.

As noted above, Raman characterization was used to follow the formation of graphene layers in the laser spot after 1 min and 10 min. FIGS. 7A and 7B show the Raman spectrum of the irradiate pitch at 1 min and 10 min, respectively. The appearance of the D peak and G peak in the Raman spectrum of the laser irradiated zone confirms the formation of graphene at the surface of the substrate as well as the successful conversion of pitch to graphene layers.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method for synthesizing graphene, the method comprising:

depositing pitch on a substrate to provide a pitch sample; and pyrolyzing at least a portion of the pitch sample with a laser, thereby forming graphene, wherein pyrolyzing the at least a portion of the pitch sample with the laser comprises directly irradiating the at least a portion of the pitch sample with an excimer laser, and wherein the excimer laser emits light having a wavelength in a range from 300 to 320 nm and a frequency in a range from 45 to 55 HZ.

2. The method of claim 1, wherein the depositing comprises:

spin-coating the pitch sample on the substrate to form a uniformly coated pitch sample.

3. The method of claim 1, prior to pyrolyzing the at least a portion of the pitch sample, further comprising:

removing one or more atmospheric gases from the pitch sample with a vacuum; and introducing an inert gas to the pitch sample.

4. The method of claim 3, wherein pyrolyzing the at least the portion of the pitch sample is performed under vacuum.

5. The method of claim 1, wherein the laser has a laser pulse energy in a range from 290 to 310 mJ.

6. The method of claim 1, wherein irradiating the at least a portion of the pitch sample comprises irradiating the at least a portion of the pitch sample with an excimer laser for a period of time in a range from 1 minute to 10 minutes.

* * * * *